June 15, 1954   F. F. DAUENHAUER   2,681,066
APPARATUS FOR PICKING HOPS FROM HOP BRANCHES
AND CLUSTERS AND FOR SEPARATING
LEAVES AND STEMS THEREFROM

Filed Aug. 16, 1950   4 Sheets-Sheet 1

INVENTOR.
FLORIAN F. DAUENHAUER.
BY
ATTORNEYS.

June 15, 1954  F. F. DAUENHAUER  2,681,066
APPARATUS FOR PICKING HOPS FROM HOP BRANCHES
AND CLUSTERS AND FOR SEPARATING
LEAVES AND STEMS THEREFROM
Filed Aug. 16, 1950  4 Sheets-Sheet 2

INVENTOR.
FLORIAN F. DAUENHAUER
BY
Nunn, Liddy & Glacum
ATTORNEYS.

Patented June 15, 1954

2,681,066

UNITED STATES PATENT OFFICE 2,681,066

APPARATUS FOR PICKING HOPS FROM HOP BRANCHES AND CLUSTERS AND FOR SEPARATING LEAVES AND STEMS THEREFROM

Florian F. Dauenhauer, Santa Rosa, Calif.

Application August 16, 1950, Serial No. 179,724

18 Claims. (Cl. 130—30)

An object of my invention is to provide an apparatus for picking hops from hop branches and clusters and for separating leaves and stems therefrom which is especially designed to receive hop clusters and broken off vine portions that are delivered from the hop picking machine shown in my copending application, Ser. No. 179,722, filed August 16, 1950. The present apparatus comprises two main parts, a trommel for separating hops from the other vine portions, and a branch picker for removing hops from hop branches and hop clusters. The branch picker could be used for purposes other than picking hops from branches, such as by way of example, the picking of string beans from vines.

A further object of my invention is to provide a device of the type described in which the trommel and hop branch picker cooperate with each other to pick hops from branches and hop clusters and to separate the hops from all other parts of the hop vines. The trommel removes freed hops and delivers all other portions of the vine and any hops carried thereby, to the hop branch picker. The hop branch picker severs the hops from any vine portions or hop clusters and delivers the freed hops back to the trommel for screening.

A further object of my invention is to provide a device of the type described which is efficient for the purpose intended and will effectively pick and separate hops from hop vine branches or clusters.

Other objects and advantages will appear in the following specification, and the novel features of the device will be particularly pointed out in the appended claims.

My invention is illustrated in the accompanying drawings forming a part of this application, in which.

While I have shown only the preferred form of my invention, it should be understood that various changes or modifications may be made within the scope of the appended claims without departing from the spirit and scope of the invention.

In carrying out my invention I will describe the structure of the trommel in detail and then will describe the structure of the branch picker in detail.

Trommel

Figure 1:
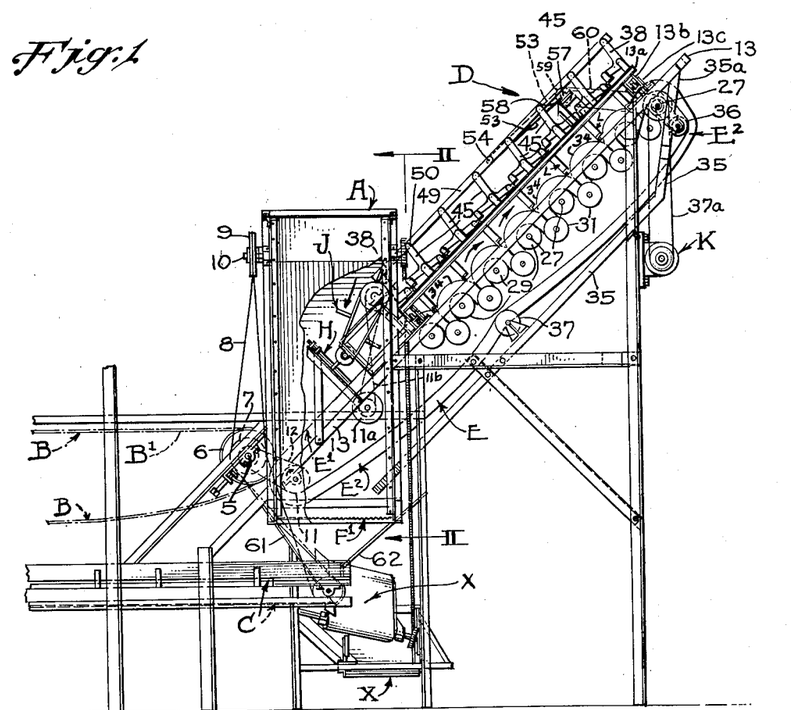
Figure 1 is a side elevation of the device a portion being broken away for clarity and is shown coupled to my hop picking machine.
Figure 2:
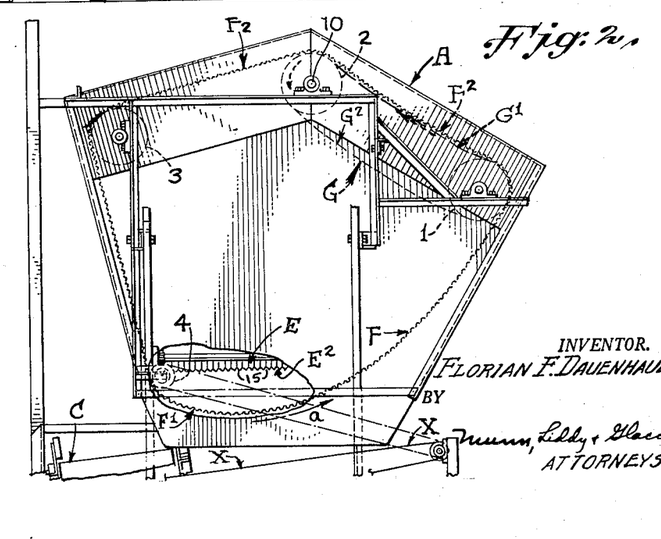
Figure 2 is a transverse section taken along the line II—II of Figure 1, and illustrates the trommel.

In Figures 1 and 2 I show the trommel at A in its relation to the hop picking machine which is described and claimed in my copending application Ser. No. 179,722, filed August 16, 1950. In the copending case, hops are picked from the vines and are delivered to an endless screen conveyor B, also shown in Figure 1. The screen conveyor has large enough openings to permit the hops to pass therethrough and to be delivered to a discharge conveyor belt that parallels the hop picker and is indicated generally at C in Figure 2. The hops and any smaller foreign particles that pass through the endless screen conveyor B and delivered to the discharge conveyor belt C, are carried by the conveyor C to a hop separating belt mechanism indicated generally at X in Figure 1 and described in detail and claimed in my copending application on an Apparatus for Separating Picked Hops From Leaves and Stems, Serial No. 179,723, filed August 16, 1950.

The trommel A in the present case is designed to receive hop vine branches, hop clusters and the like which have been removed from the hop vines by the picking fingers of my hop picker and have been delivered to the upper reach B1 of the endless screen conveyor B. This material is too large to pass through the screen conveyor and to be delivered to the discharge conveyor C. Figure 1, therefore, shows the endless screen conveyor B delivering this material to the interior of the trommel A.

The branch picker indicated generally at D in Figure 1, has a combined picker and endless conveyor shown at E, whose upper reach E1 extends into the interior of the trommel and receives the material from the screen conveyor B. Some of this material will be small enough to pass directly through both the upper and lower reaches E1 and E2 of the combined picker and endless conveyor E. This material will drop upon the lower reach F1 of an endless screen conveyor F mounted in the trommel A. The lower reach F1 moves in a direction at right angles to the direction of travel of the upper reach B1 of the screen conveyor B. Any free hops that reach the upper surface of the lower reach F1 will pass directly through the endless screen conveyor F and will be discharged upon the hop separating belt mechanism indicated generally at X and described in my above mentioned copending application serial No. 179,723.

In Figure 2, the endless screen conveyor F is shown provided with an upper reach F2 that is spaced a considerable distance above the lower reach F1 in order to provide room for a portion of the endless conveyor E. The upper reach F2 of the endless screen conveyor F is passed over three supporting drums 1, 2 and 3 shown in Figure 2. The endless screen conveyor F moves in a counter-clockwise direction when looking at Figure 2 and an idler 4 positions the lower reach F1 in proper relation with respect to the upper reach F2. As the lower reach F1 moves in the direction of the arrow a shown in Figure 2, any freed hops delivered to this portion will pass through the conveyor. All of the rest of the material will remain on the upper surface of the lower reach F1 and will be carried upwardly toward the drum 1.

I provide novel means for preventing the material carried up to the upper reach F2 by the moving screen conveyor F from dropping back upon the lower reach F1 until this material is carried substantially to a central point of the trommel and above the upper reach E1 of the combined picker and endless conveyor E. When the material reaches this portion, it will fall upon the upper reach E1 of the branch picker D for the picking of any hops that might be clinging to the hop vine material. The novel means comprises an endless moving shield G in the shape of a conveyor belt that is passed around the drums 1 and 2 and underlies that portion of the upper reach F2 that extends between the two drums. The upper reach G1 of the moving shield will prevent any material carried along by the under surface of the upper moving reach F2, from dropping down upon the lower reach F1 of the endless screen conveyor.

The endless moving shield G will be moved at the same speed as the endless screen conveyor F and therefore the two members will hold any foreign material therebetween and will carry it up to the top center of the trommel A. At this point, the upper reach G1 of the moving shield turns back on itself as it passes around the drum 2 and becomes a portion of the lower reach G2. The material carried along by the under surface of the upper reach F2 is now freed from the shield G1 and will drop upon the upper reach E1 of the branch picker D. The endless screen conveyor F of the trommel A will only permit separated hops to drop through the screen F and any other material that is small enough to pass through the mesh of the screen.

In Figure 1 I illustrate one way of operating the trommel. It will be seen from this figure that the shaft 5 that carries the drum 6 around which the endless screen conveyor B moves has a sprocket 7 around which a sprocket chain 8 is passed. The sprocket chain 8 is also passed around a sprocket 9 that is mounted on a shaft 10 and this shaft supports the drum 2 shown in Figure 2. The drum 2 is rotated in a counter-clockwise direction and will cause the endless screen conveyor F to move in the manner already explained.

Branch picker

I will now describe the branch picker D in detail and will show its relation to the trommel A. I have already set forth how the branch picker is provided with a combined picker and endless conveyor E. Figure 1 shows the endless conveyor E as being passed around a drum 11 that is disposed within the trommel A and is positioned a slight distance above the lower reach F1 of the screen conveyor F. The drum 11 is rotated in a clockwise direction and I indicate a chain and sprocket drive 12 for connecting the drum 11 to the shaft 5. The endless conveyor E therefore drives the shaft 5 and moves the screen conveyors B and F.

The frame 13 for supporting the combined picker and endless conveyor E, extends upwardly at an angle from the trommel A, as clearly indicated in Figure 1. The combined conveyor and picker E is provided with two endless chains 30, spaced apart and carrying a plurality of transversely extending angle irons 14, see Figures 10 and 12. The angle irons 14 carry hop picking fingers 15 of the shape shown in my copending application on the hop picking machine. These fingers extend in rows across each bar 14 and will act as conveying members for carrying material dropping thereon from the conveyor B or from the trommel A. This material will be conveyed in an upwardly inclined direction and past a hop vine branch spreader comprising a fixed breaker fork H clearly shown in Figures 3 to 7, inclusive and a rotary feeder fork J.

Hop vine branch spreader

Figure 3:
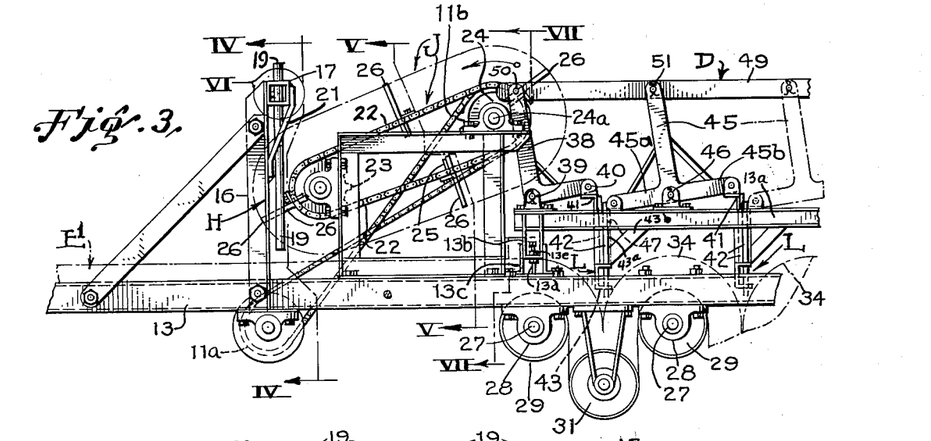
Figure 3 is an enlarged side elevation of a portion of the branch picker.
Figures 4, 5, 6:
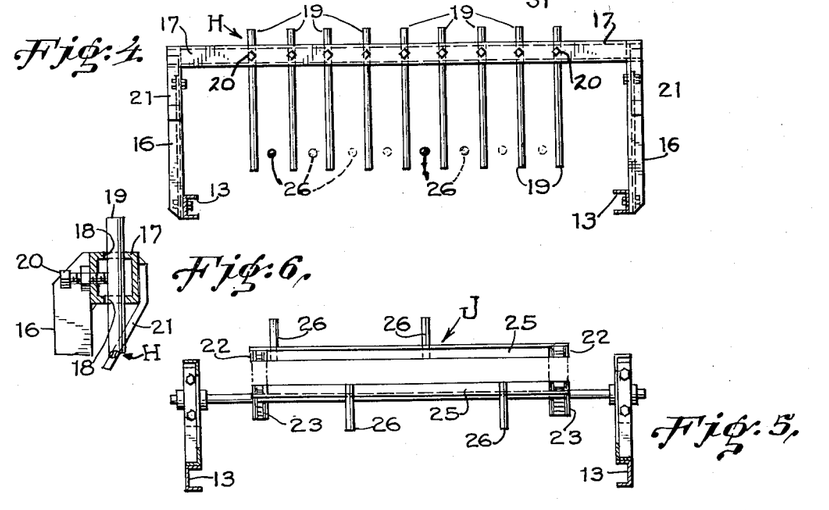
Figure 4 is a transverse section taken along the line IV—IV of Figure 3, and illustrates the fixed breaker fork of the branch picker.
Figure 5 is a transverse section taken along the line V—V of Figure 3, and shows the rotary feeder forks.
Figure 6 is an enlarged detail of the circled portion VI shown in Figure 3, and shows the supporting means for one of the tines in the fixed breaker fork.

Figure 3 illustrates the side members 13 of the branch picker D as supporting uprights 16 and these uprights in turn support a cross beam 17 which is square in cross section, see Figures 3 and 4 and 6. The frame members 13 are shown in a horizontal position in Figure 3, although in actual practice they extend upwardly at an angle as illustrated in Figure 1. The cross beam 17 has openings 18 in its upper and lower surfaces for receiving tines 19 that form the stationary or fixed breaker fork H. In Figure 4 I show nine tines 19, although I do not wish to be confined to this exact number and I also show these tines as being adjustably held in place by set screws 20, see Figure 6, so that their lower ends can be spaced above the upper reach E1, see Figure 3. Reinforcing braces 21 are secured to the free vertical face of the box beam 17 and have their lower ends welded to the uprights 16 so as to hold the box beam against any twisting action which might result from the portion of vines contacting the tines 19 and tending to swing them in a counterclockwise direction about the box beam 17 as a center.

Figure 7:
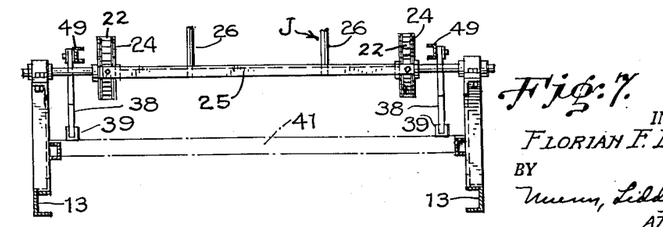
Figure 7 is a transverse section taken along the line VII—VII of Figure 3, and shows the rocker levers used in connection with the vertically movable forks.

I provide novel means for forcing the branch portions through the stationary fork H of the hop vine branch spreader and separator and this means comprises the rotary feeder fork indicated generally at J in Figures 3, 5 and 7. The rotary feeder fork is composed of a pair of endless sprocket chains 22 which are mounted on pairs of sprockets 23 and 24. Figure 5 shows the pair of sprocket chains 22 supporting angle-shaped cross bars 25 and these bars in turn carry fingers or tines 26.

Figure 15:
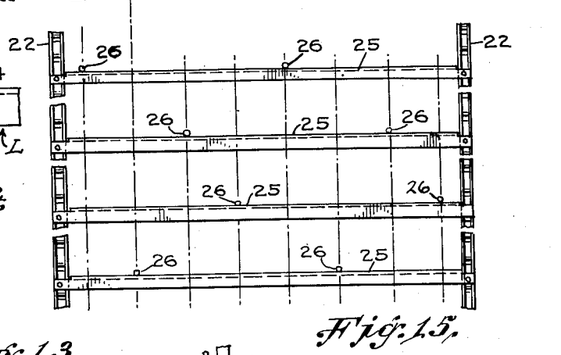
Figure 15 illustrates the arrangement of the tines in the rotary feeder fork.

Referring to Figure 3, it will be seen that I make use of four cross bars 25 and each one carries a pair of tines or fingers 26. The tines, however, are placed in different positions on each of the cross bars 25. In the development view of Figure 15, I show the two chains 22 spaced apart and I also show the four cross bars 25. The pairs of tines 26 carried by the successive cross bars are arranged in different positions on each bar as shown in Figure 15. In Figure 4 I show two of the tines 26 passing through the first and fifth spaces (counting from the left) provided between the first and second, and the fifth and sixth tines 19. I also show by dotted circles how the other pairs of tines shown in Figure 15, will pass through the spaces of the other bars or stationary tines 19 of the combing and breaker fork H.

In Figure 3, one pair of moving tines 26 is shown passing between the stationary tines 19. The moving tines 26 or stripper bars, will reach through the slots in the fixed combing and breaker fork H and will pull any hop vine portions that are held up by the tines 19, through the slots. A spreading as well as a separating action is imparted to the vine portions by this action. The rotary feeder and breaker fork J will also open up any masses of vine portions that are temporarily restrained by the fork H. The vine portions will be spread out more uniformly in a horizontal layer on top of the upper reach E1 of the combined picker and endless conveyor E.

Branch and cluster picking unit

Figures 8, 9, 10, 11:
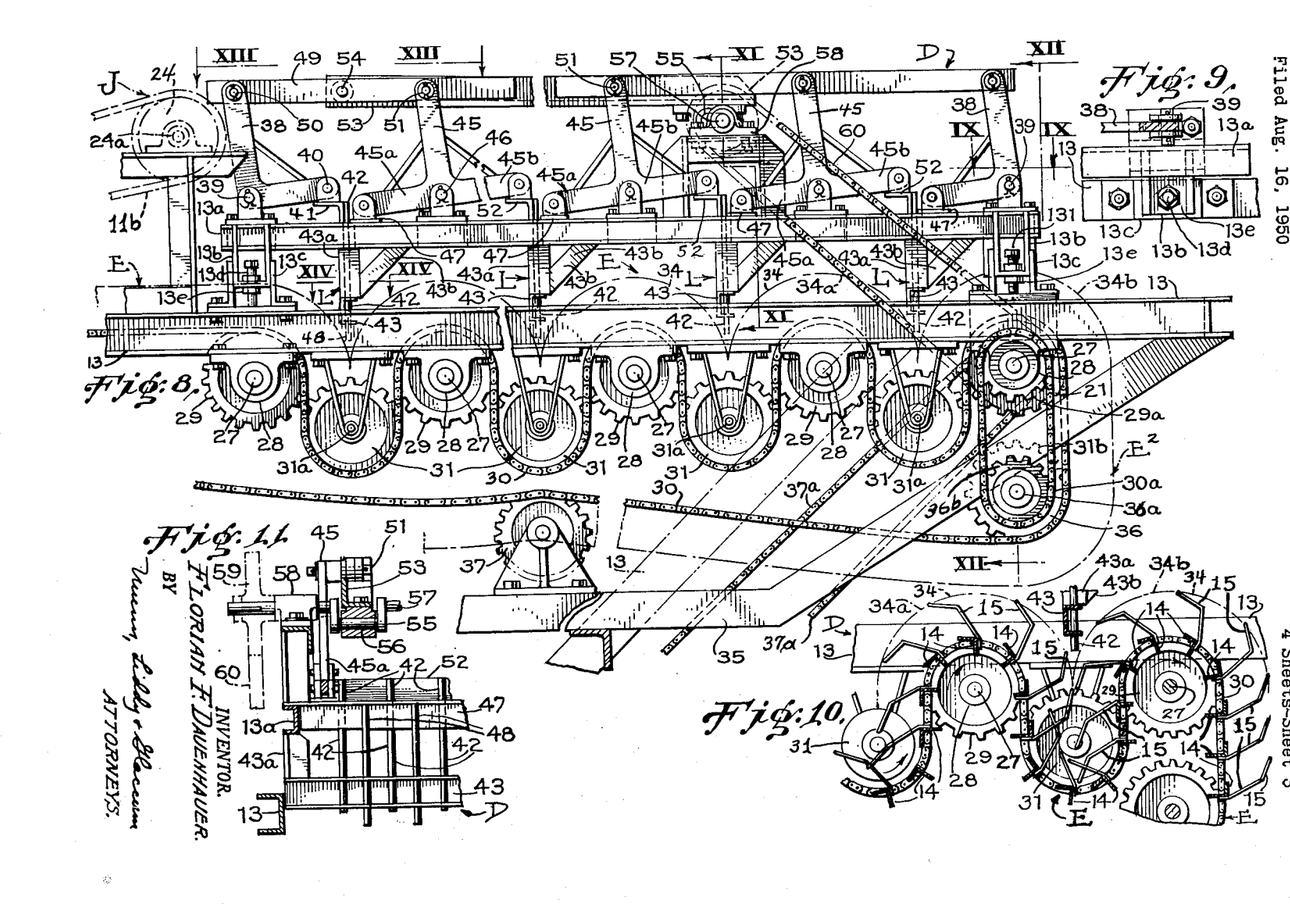
Figure 8 is an enlarged side elevation of a portion of the branch picker and shows the rocker levers with their vertically movable forks and the hop picking means associated with the forks.
Figure 9 is a horizontal section taken along the line IX—IX of Figure 8, and shows the mounting for one of the rocker levers.
Figure 10 is a vertical section taken along the line X—X of Figure 12 and shows how the hop picking fingers are moved in relation to the vertically reciprocable forks.
Figure 11 is a transverse section taken along the line XI—XI of Figure 8 and illustrates the means for oscillating the rocker levers that in turn reciprocate the vertically movable forks.
Figure 12:
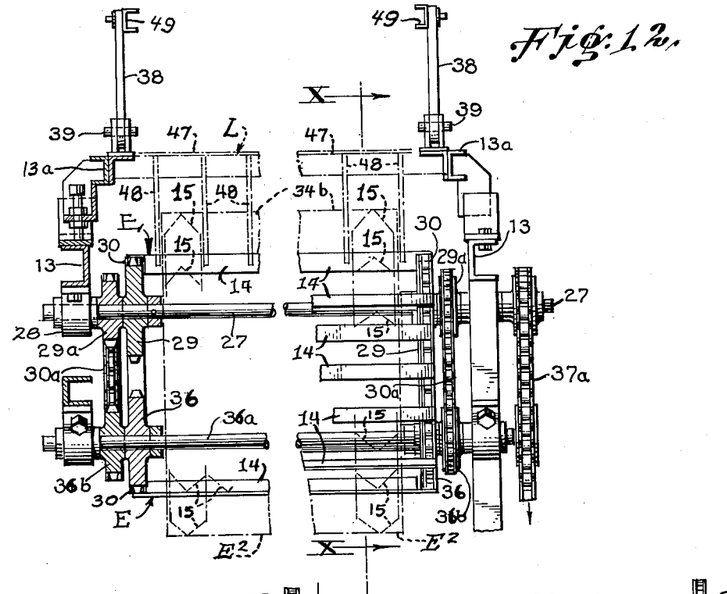
Figure 12 is a transverse section taken along the line XII—XII of Figure 8.

The vine portions are now ready to enter the branch and cluster picking unit of the branch picker D. In Figure 8, a detail of the branch and cluster picking unit is illustrated with the frame members being shown in a horizontal position rather than in the inclined position shown in Figure 1. The unit comprises a plurality of cross shafts 27, see also Figure 12, and these are mounted in bearings 28 that are secured to the frame members 13. The extreme right hand cross shaft 27 shown in Figure 8 is also shown in Figure 12 and since each shaft supports a pair of sprockets 29 which carry a portion of the combined picker and endless conveyor E, a detail description of the right hand shaft 27 shown in Figure 8 and the adjacent shaft 27, will suffice for all of the similarly numbered shafts. Again referring to Figure 12, I show the combined picker and endless conveyor E composed of two endless sprocket chains 30 that are passed around the sprockets 29 and around idler sprockets 31. Figure 8 shows an idler sprocket 31 placed between every two sprockets 29.

Cross bars 14 which are angular in shape, see Figure 10, extend between the parallel chains 30 and are connected thereto in spaced relation. These cross bars carry a row of picker fingers 15 and the fingers extend outwardly from the bars as shown in Figure 10, the outer ends of the fingers describing arcs indicated by the dot dash lines 34 in the same figure. The idler sprockets 31 are not only placed between adjacent pairs of sprockets 29, but they are positioned below the sprockets 29 so as to form the combined picker and endless conveyor E into a series of reverse curves. The portions of the conveyor E extending between adjacent sprockets 29 and 31, move in planes at right angles to a plane extending through the frame members 13. This arrangement causes the fingers 15 after passing through an arc 34, see Figure 10, to move in a direction at right angles to the frame members 13 and to a position below the frame members. As the chains 30 move around the idler sprocket 31, the fingers 15 are altered in their line of travel so as to be reversed in their direction and start moving toward the frame members 13 and again in a direction at right angles to the plane of the frame members. The chains 30 will then pass around the next pair of sprockets 29 and the fingers 15 will move through another arc 34. Figures 1 and 8 illustrate how the arcs 34 formed by the ends of the picker fingers will extend throughout the length of the branch picking unit of the member D. Figure 1 shows seven such arcs 34, but I do not wish to be confined to any particular number.

The purpose of moving the upper reach E1 of the endless picker chain E in a series of arcs 34 is to spread the fingers while at the same time giving them an arcuate sweeping action in order to reach all portions of the hop vine branches or hop clusters that have been broken up by the stationary combing and breaker fork H and the movable breaker fork J. It will be seen from Figure 10 that the actual movement of the combined picker and endless conveyor E will be in a clockwise direction as the conveyor passes around the two sprockets 29 shown in this figure. The fingers 15 in passing through the left hand arc 34a in Figure 10, will take a convex path picking action against the hop branches disposed directly above these fingers. The fingers will remove any hops on these branches and the freed hops will drop onto an inclined conveyor 35 shown in Figure 1 and will be carried back to the upper surface of the lower reach F1 of the endless screen conveyor F in the trommel A.

Again referring to Figure 10, after the fingers 15 have passed through the arc 34a to pick hops, they will be carried around the idler sprocket 31 and then will be moved through another convex arcuate sweep 34b in a clockwise direction to perform another picking action on the hop branches. The right hand sprocket 29 in Figure 10 is the final one and the combined picker and endless conveyor E in passing round this sprocket, will discharge any remaining material that passes beyond the final arc 34b from the branch picker.

Again referring to Figures 1 and 8, it will be seen that I provide an idler sprocket 36 that spaces a portion of the lower reach E2 of the endless conveyor E out of contact with the adjacent idler sprocket 31 so that there will be no interference between these chain portions. The lower reach E2 of the endless picker chain E is passed over a centrally disposed supporting idler sprocket 37 before the chain reaches the drum 11. Any means for moving the chain E can be used and I have shown in Figure 1 a motor K that has a sprocket and chain connection 37a with the shaft 27, see Figure 12, that is disposed at the right hand end of the row of shafts 27 illustrated in Figure 8. Another idler sprocket 11a supports the upper reach E1 and is connected to the shaft 24a by a crossed chain and sprocket connection indicated generally at 11b in Figure 1.

The means for driving the combined picker and endless conveyor E is clearly shown in Figures 8 and 12. The right hand shaft 27 in Figure 8 is connected to the motor K by the chain and sprocket connection 37a. In Fig. 12, I show the right hand shaft 27 of Fig. 8, provided with a pair of sprockets 29a disposed adjacent to the sprockets 30. The idler sprockets 36 are mounted on a shaft 36a and the same shaft carries a pair of driven sprockets 36b that are placed adjacent to the sprocket 36. The sprockets 29a are connected to the sprockets 36b by sprocket chains 30a. It will therefore be seen that the motor K drives the conveyor E by the chain and sprocket connection 37a. It will also be seen that the shaft 36a is positively connected to the right hand shaft 27 in Figure 8 by the chains 30a and sprockets 29a and 36b. Any type of power mechanism may be used for actuating the conveyor E.

Hop vine branch retarding baffles

I provide a plurality of baffles L, see Fig. 1, for retarding the movement of the material through the branch picking unit in order to give the fingers 15 a greater length of time to act on the vine. I place a baffle L between each pair of arced portions 34 of the conveyor E shown in Fig. 8 and the purpose of these is not only to retard the movement of the hop branches so that the fingers 15 will have sufficient time to act on the hop branches and remove hops therefrom, but in addition to cause the vines to move in an undulating path along the conveyor E.

Figure 13:
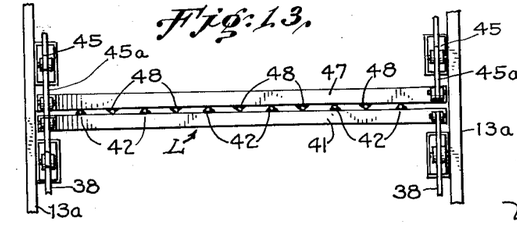
Figure 13 is a top plan view of a portion of Figure 8 when looking in the direction of the arrows XIII—XIII.
Figure 14:
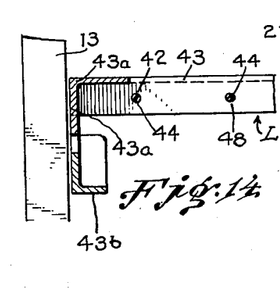
Figure 14 is an enlarged horizontal section taken along the line XIV—XIV of Figure 8, and illustrates a guide for one of the vertically movable forks.

Each baffle L comprises a pair of vertically reciprocable combs. In Fig. 8 I illustrate a bell-crank lever 38 as being a part of the left hand baffle L and the lever is pivoted to the frame members 13a at 39, see also Fig. 9. Two spaced-apart bell-crank levers 38 are used at the left hand end of Fig. 8, and their lower arms are pivotally secured at 40 to a cross member 41 of a vertically movable comb. The cross member 41 carries a plurality of tines 42 that constitute the comb and extend at right angles to the plane of the spaced-apart frame members 13a and 13a. In Figure 13 I show a top plan view of the bell-cranks 38 and indicate how they are connected to the cross member 41 of one of the combs. The fingers or tines 42 are also welded to the cross member 41. The fingers 42 are guided in their vertical movement by a horizontally positioned channel iron 43, see Figures 8 and 14, and this channel iron has openings 44 for slidably receiving the tines 42.

Again referring to Figure 8, it will be seen that a T-shaped bell-crank 45 is arranged adjacent to the left-hand bell-crank 38 and has an arm 45a that extends to the left of a pivot point 46 and this arm has a cross member 47 which is similar in shape to the cross member 41 and constitutes a portion of a second reciprocable comb. The cross member 47 carries a plurality of tines 48, see Figure 13, which lie in the same plane as the tines 42 and these tines are clearly shown in Figure 13. The tines 48 have their lower ends slidably received in every other one of the openings 44 in the channel 43, see Figure 14.

The upper frame members 13a which supports the pairs of bell cranks 38 and 45 are adjustably supported on the lower frame members 13 by depending members 13b that are slidably received in guides 13c, supported by the frame members 13, see Figure 8. Cap screws 13d are threaded into nuts 13e, carried by the depending members 13b and bear on the members 13 for supporting the frame members 13a the desired height above the frame members 13.

Figure 8 illustrates how the lower ends of the tines 42 and 48 forming the left hand baffle L and comprising the pair of reciprocable combs, extend down into the transverse trough formed by a portion of the conveyor E as it dips around the left hand pair of idlers 31. The left hand baffle L in Figure 8 comprising the two reciprocable combs 42 and 48 includes the guide channel 43 for the combs and the supports 43a that connect the channel to the frame members 13a together with the bracing members 43b for the supports. Since the baffles L are entirely supported by the frame members 13a, it is possible to raise or lower them with respect to the conveyor E by adjusting the cap screws 13d. The vine portions carried along by the finger carrying conveyor E must pass under the channels 43 of the baffles L and in addition must thread through the alternately lowered combs 42 and 48. The combs retard the vine movement and permit the fingers 15 to perform their picking operation on the vine portions. It is also possible to lift the upper frame 13a with its bell crank levers and combs off from the lower frame 13 for the purpose of inspecting the combs and other mechanism.

I provide means for rocking the bell-cranks 38 and 45 about their pivots 39 and 46, and this means comprises a bar 49 that is pivoted to the bell-crank 38 at 50 and is pivoted at 51 to the bell-crank 45. A reciprocation of this bar will rock the bell-cranks and the structure is such that the comb 42 will be lifted while the comb 48 will be lowered and this movement will alternate between the combs so long as the machine operates. The vertical movement of the combs is such as to bring the lower ends of the tines 42 and 48 up to a level with the underside of the channel iron 43, see Figure 8. The reciprocal movement of the pair of combs 42 and 48 will retard the flow of hop branches and hop clusters through the machine. In fact, the hop branches and clusters must pass downwardly and under the channel iron 43 when moved along through the branch picking portion of the device.

In Figure 1, I illustrate a bell-crank lever 38 at each end of the branch picking unit of the machine, and between these end bell-crank levers I place six T-shaped bell-cranks 45. Again, I do not wish to be confined to this exact number of units. Where two T-shaped bell-cranks 45 are arranged side by side, see Figures 8 and 11, the arm 45b of one bell-crank 45 will cooperate with an adjacent arm 45a of the next T-shaped bell-crank to reciprocate a pair of combs 52 and 47, respectively.

I provide two bars 49 and pivotally connect one to the upper ends of one row of bell-cranks 38 and 45 and pivotally connect the other one to the upper ends of a similar row of bell cranks. The bell cranks 38 and 45 are provided in pairs and are placed at opposite sides of the picking unit. The means for reciprocating the two bars 49 is shown in Figures 8 and 11. A connecting rod 53 is pivoted to each bar 49 at 54 and the free end of each rod 53 is connected at 55, see Figure 11, to a crank portion 56 of a crank shaft 57. The crank shaft is mounted in bearings 58 and it carries a sprocket 59, see Figures 1 and 11, which is connected by a sprocket chain 60 to the right hand end shaft 27.

As the crank shaft 57 is rotated, the crank portions 56 will reciprocate the connecting rods 53 which in turn will reciprocate the bars 49. All of the pairs of bell-cranks 38 and 45 will be oscillated and the oscillation of the bell-cranks will reciprocate the combs 42 and 48 which control the flow of material along the conveyor E.

Operation

The trommel A performs its work in the manner already described and delivers hops and other material which is small enough to pass through the mesh of the lower reach F1 of the screen conveyor F, to the belt X in Figure 1. The bottom of the trommel has inclined boards 61 and 62 for guiding the freed hops and other small material to the left hand side of the conveyor X. My copending case, Serial No. 179,723, sets forth how the belt X functions.

The material dropped upon the upper reach E1 of the combined picker and endless conveyor E by the screen mesh conveyor B of the hop picker and by the upper reach F2 of the trommel A will be carried to the hop vine branch and cluster spreader consisting of the fixed comb or breaker fork H and the rotary feeder fork J. The vine branches are broken and separated and are then carried to the picking unit.

The upper reach E1 of the conveyor E is formed into a plurality of successive convex arcuate portions 34 by the sprockets 29 and these are separated from each other by the valleys in the upper reach formed by the idler sprockets 31. In each valley I mount a baffle L comprising a pair of reciprocable combs 42 and 48. The convex arcuate portions 34 of the upper reach E1 are curved to spread the outer ends of the finger 15 and move them in a convex arc into the branches containing the hops. The baffles L cooperate with the convex curved portions 34 of the upper reach to cause the vines to move in an undulating path along the upper reach E1. The vine portions passing under the channels 43 are curved in a convex manner and are thus opened up to the convex sweep of the fingers 15 as they move over the convex arcs 34. A more efficient picking of hops results from this particular movement of vines and picking fingers.

The convex curvatures 34 of the upper reach E1 carries the vines against the pairs of alternately reciprocable combs in each baffle L. The vines are carried downwardly by the upper reach E1 just before they reach the baffle and then are carried upwardly on the other side. The vines are momentarily held by each comb while in its "down" position and then this comb releases its hold on the vines while its companion comb takes over and moves into its "down" position. The fingers 15 will pick hops from the vines while the latter are held temporarily by the combs which are in their "down" positions.

The freed hops will drop upon the inclined chute 35 and be conveyed to the upper surface of the lower reach F1 of the screen mesh conveyor F. Here the freed hops will sift through the mesh of the screen F and drop upon the belt X. The stems and other material will be fed out at the top of the upper reach E1.

I claim:

1. In combination; a trommel and a branch and hop cluster picker; the trommel having a screen conveyor with a lower reach designed to receive hop vine branches and hop clusters, the mesh of the screen being only large enough to permit individual hops to pass therethrough; the conveyor having an upper reach disposed a considerable distance above the lower one; a shield underlying a portion of the upper reach and being positioned for cooperation therewith for supporting any material too large to pass through the mesh of the lower reach and that is moving from the upper surface of the lower reach onto the under surface of the upper reach; whereby the shield will support this material throughout the length of the shield; the branch and cluster picker including a conveyor having a portion extending above the lower reach of the trommel endless conveyor and under the upper reach thereof and in a position to receive any material carried by the upper reach of the trommel screen beyond the end of the shield; hop picking means for acting upon the material received by the second-named conveyor and for removing any hops therefrom; and means for delivering the hops freed by the hop picking means to a position above the lower reach of the first-named conveyor for screening purposes.

2. In a device of the type described; a trommel comprising an endless screen conveyor having a lower reach designed to receive material to be screened; means disposed below the lower reach for receiving any material passing through the screen; the conveyor having an upper reach disposed a considerable distance above the lower one; a material supporting shield underlying a portion of the upper reach of the screen conveyor and extending from a point where the upper reach starts; said shield comprising an endless conveyor having an upper reach paralleling a portion of the upper reach of the screen conveyor; means for causing the upper reach of the conveyor shield to travel at the same speed as the adjacent portion of the upper reach of the screen conveyor; and means disposed between the upper and lower reaches of the screen conveyor for receiving material dropped from the upper reach as this material passes beyond the material supporting shield.

3. In a device of the type described; a branch picker comprising a combined picker and endless conveyor for moving the material to be picked; a fixed breaker fork having depending tines extending to a slight distance above the conveyor for temporarily arresting the movement of the material; a rotary feeder fork with stripper bars adapted to pass between the tines and pull the material past the tines; and means for moving the conveyor and the rotary feeder fork for causing the stripper bars to pass between the depending tines and force material between tines of the fixed breaker fork; said rotary feeder fork including a pair of endless chains spaced apart and passed around pairs of sprockets; spaced cross bars connected to the chains; said stripper bars being arranged in pairs with each pair being connected to a different cross bar; each cross bar having its pair of stripper bars disposed in a position different from the other pairs so that only two stripper bars will be passing between the stationary tines at any given time and all of the spaces between the tines will have at least one breaker bar pass therethrough for each complete cycle of the pair of endless chains.

4. In combination; a combined picker and endless conveyor including a pair of endless chains with spaced cross bars extending therebetween and carried thereby; hop picking fingers carried by each cross bar; a plurality of pairs of sprockets lying in the same plane and supporting the upper reach of the conveyor, each pair being spaced from adjacent pairs; a pair of idler sprockets positioned in each space provided between the pairs of the first-mentioned sprockets and being placed below the plane thereof, the endless chains being alternately passed round the upper and the lower pairs of sprockets to form a plurality of valleys in the upper reach of the conveyor; a baffle positioned at each valley and composed of a pair of reciprocable forks; and means for moving the conveyor and reciprocating the forks so that one fork of each baffle will extend into its associate valley and vice versa during the movement of the conveyor.

5. In combination; a combined picker and endless conveyor including a pair of endless chains with spaced cross bars extending therebetween and carried thereby; hop picking fingers carried by each cross bar; a plurality of pairs of sprockets lying in the same plane and supporting the upper reach of the conveyor, each pair being spaced from adjacent pairs; a pair of idler sprockets positioned in each space provided between the pairs of the first-mentioned sprockets and being placed below the plane thereof, the endless chains being alternately passed around the upper end the lower pairs of sprockets to form a plurality of valleys in the upper reach of the conveyor; a baffle positioned at each valley and composed of a pair of reciprocal forks; and means for moving the conveyor and reciprocating the forks so that one fork of each baffle will extend into its associate valley and vice versa during the movement of the conveyor; the two forks of each baffle lying in the same plane; the first mentioned sprockets and the idlers being so arranged that the fingers of the conveyor will move in planes substantially paralleling the plane of the forks in each baffle so that a picking action will take place while the material being moved by the upper reach is temporarily arrested by the forks in the baffles.

6. In combination; a combined picker and endless conveyor including a pair of endless chains with spaced cross bars extending therebetween and carried thereby; hop picking fingers carried by each cross bar; a plurality of pairs of sprockets lying in the same plane and supporting the upper reach of the conveyor, each pair being spaced from adjacent pairs; a pair of idler sprockets positioned in each space provided between the pairs of the first-mentioned sprockets and being placed below the plane thereof, the endless chains being alternately passed around the upper and the lower pairs of sprockets to form a plurality of valleys in the upper reach of the conveyor; a baffle positioned at each valley and composed of a pair of reciprocable forks; and means for moving the conveyor and reciprocating the forks so that one fork of each baffle will extend into its associate valley and vice versa during the movement of the conveyor; said fork reciprocating means including pairs of rocker arms pivotally supported at points between their ends and having their oppositely extending arm ends disposed adjacent to the arm ends of the next pair of rocker arms and each pair of arm ends supporting a pair of forks; each baffle having one fork secured to the ends of an adjacent rocker arm and having its second fork secured to the ends of another adjacent rocker arm; and means for oscillating said arms for causing the adjacent rocker arm ends to move in opposite directions and to move their forks in opposite directions.

7. In combination: a trommel and a branch and hop cluster picker; the trommel having a screen conveyor with a lower reach designed to receive hop vine branches and hop clusters, the mesh of the screen being only large enough to permit individual hops to pass therethrough; the conveyor having an upper reach disposed a considerable distance above the lower one; a shield underlying a portion of the upper reach and being positioned for cooperation therewith for supporting any material too large to pass through the mesh of the lower reach and that is moving from the upper surface of the lower reach onto the under surface of the upper reach; whereby the shield will support this material throughout the length of the shield; the branch and cluster picker including means extending between the upper and lower reaches of the conveyor and disposed to receive any material carried beyond the end of the shield; and hop picking means for acting upon the material received by said first mentioned means for removing any hops therefrom and for delivering the freed hops to a position above the lower reach of the first-named conveyor for screening purposes.

8. In combination: an endless conveyor for moving hop vine parts and having an upper and a lower reach; hop-picking fingers carried thereby; means supporting the upper reach of said conveyor and guiding this reach along a path defining a plurality of spaced-apart valleys therein; a baffle positioned at each valley and projecting into engagement with the hop vine parts on the conveyor for arresting the movement of the vine parts; each baffle including a pair of reciprocable combs; means for moving the conveyor to advance the hop vine parts under the combs; and means operable to reciprocate first one comb and then the other of each baffle into the valley at which the particular baffle is positioned.

9. The combination as set forth in claim 8; and in which the pairs of combs in each baffle lie in the same plane; the means that supports the upper reach of the conveyor guiding this reach to move the hop-picking fingers thereon in planes paralleling the planes of the combs in the baffles, while passing through the valleys at the baffles during temporary arresting movement of the hop vine parts.

10. The combination as set forth in claim 8; and in which the comb-reciprocating means includes pairs of rocker arms pivotally supported at points between their ends, and having their oppositely-extending arm ends disposed adjacent to the arm ends of the next pair of rocker arms; each pair of arm ends supporting a pair of combs that lie in the same plane, and constitute a part of each baffle; and means operable to oscillate said arms to move the adjacent rocker arm ends in opposite directions and to move their combs in opposite directions.

11. In combination: an endless conveyor for moving hop vine parts; hop-picking fingers carried by the conveyor; each finger having a free end; means supporting a portion of said conveyor and guiding this portion along a path defining a plurality of alternate crests and valleys therein, with the tops of the crests lying in one plane; the conveyor portion forming each valley being U-shaped, with parallel sides that extend substantially at right angles to the plane of the crests; the U-shaped valley portion having the fingers projecting thereinto during movement of the conveyor; the parallel sides of the valley being spaced apart at a distance to present the free ends of the fingers carried by these parallel sides to move in a common plane; the fingers on one parallel side moving in one direction along the common plane in one direction, and the fingers on the other parallel side moving in the opposite direction along the common plane; and a baffle extending into the valley and projecting into engagement with the hop vine parts for retarding the movement of the vine parts therethrough.

12. The combination as set forth in claim 11; and in which at least one comb is reciprocably carried by each baffle; and means operable to reciprocate the comb to first advance it beyond the baffle and farther into the valley to engage with the vine parts and arrest movement of the vine parts, and then to retract the comb to release the vine parts.

13. The combination as set forth in claim 11; and in which two combs are reciprocably carried by each baffle; and means operable to reciprocate the combs in opposite directions, with each comb being advanced beyond the baffle and farther into the valley to engage with the vine parts and arrest movement of the vine parts, and then to reverse itself to release the vine parts; the other comb being moved farther into the valley when the first comb is retracting; whereby the movement of the vine parts are retarded when either comb is advanced and the other comb retracted.

14. In combination: an endless conveyor for moving hop vine parts and having an upper and a lower reach; hop-picking fingers carried by the conveyor; reciprocating combs positioned above said conveyor to extend transversely thereacross; these combs being movable alternately toward and away from said conveyor; means for advancing said conveyor under said combs; means operable to reciprocate said combs alternately into and out of engagement with the hop vine parts so as to alternately retard the movement of said vine parts relative to said conveyor for picking of hops by said fingers, and then releasing the vine parts for movement with said conveyor.

15. In combination: a conveyor for moving hop vine parts; hop-picking fingers carried by the conveyor; combs positioned above said conveyor to extend transversely thereacross; these combs being movable alternately toward and away from said conveyor; means for advancing said conveyor under said combs; means operable to move said combs alternately into engagement with hop vine parts so as to alternately retard the movement of said vine parts relative to said conveyor for picking of hops by said fingers, and then releasing said vine parts for movement with said conveyor.

16. A picking machine comprising a frame; a conveyor movably mounted on said frame; picking fingers attached to said conveyor and extending outwardly therefrom; combs mounted on said frame to extend transversely across the conveyor; these combs being movable toward and away from said conveyor; means for moving said conveyor under the combs; means operable to move said combs into and out of engagement with hop vine parts being carried by said conveyor for respectively retarding the movement of said vine parts with respect to said conveyor for picking of hops by said fingers, and then releasing said vine parts for movement with said conveyor.

17. A picking machine comprising a frame; a continuously-moving conveyor movably mounted in the frame; picking fingers attached to said conveyor and extending outwardly therefrom; combs movably mounted on said frame to extend transversely across the conveyor; these combs being movable toward and away from said conveyor; means for continuously moving said conveyor under said combs; means operable to move said combs into and out of engagement with the hop vine parts being carried by said conveyor for respectively retarding the movement of said vine parts for picking of hops by said fingers, and then releasing said vine parts for movement with said conveyor.

18. A picking machine comprising a frame; a conveyor movably mounted on said frame; picking fingers attached to said conveyor; combs movably mounted on said frame to extend transversely across the conveyor; these combs being movable toward and away from said conveyor; means operable to move said combs into and out of position to engage material carried by said conveyor for respectively retarding the movement of said material with respect to said conveyor for picking action by the fingers on said material, and then releasing said material for movement with said conveyor.

References Cited in the file of this patent

UNITED STATES PATENTS

| Number | Name | Date |
| --- | --- | --- |
| Re. 22,889 | Dauenhauer | June 17, 1947 |
| 141,526 | Verill | Aug. 5, 1873 |
| 642,769 | Wessel | Feb. 6, 1900 |
| 710,981 | Jessup | Oct. 14, 1902 |
| 716,587 | Smith | Dec. 23, 1902 |
| 808,442 | Ferguson et al. | Dec. 26, 1905 |
| 857,461 | Horst et al. | June 18, 1907 |
| 1,196,458 | Jockisch | Aug. 29, 1916 |
| 1,300,090 | Yatzuk | Apr. 8, 1919 |
| 1,728,075 | Norton | Sept. 10, 1929 |
| 2,071,743 | Hartburg | Feb. 23, 1937 |
| 2,114,727 | Thys | Apr. 19, 1938 |
| 2,212,296 | Livermon | Aug. 20, 1940 |

FOREIGN PATENTS

| Number | Country | Date |
| --- | --- | --- |
| 414,459 | Germany | June 5, 1925 |